Figure 1:
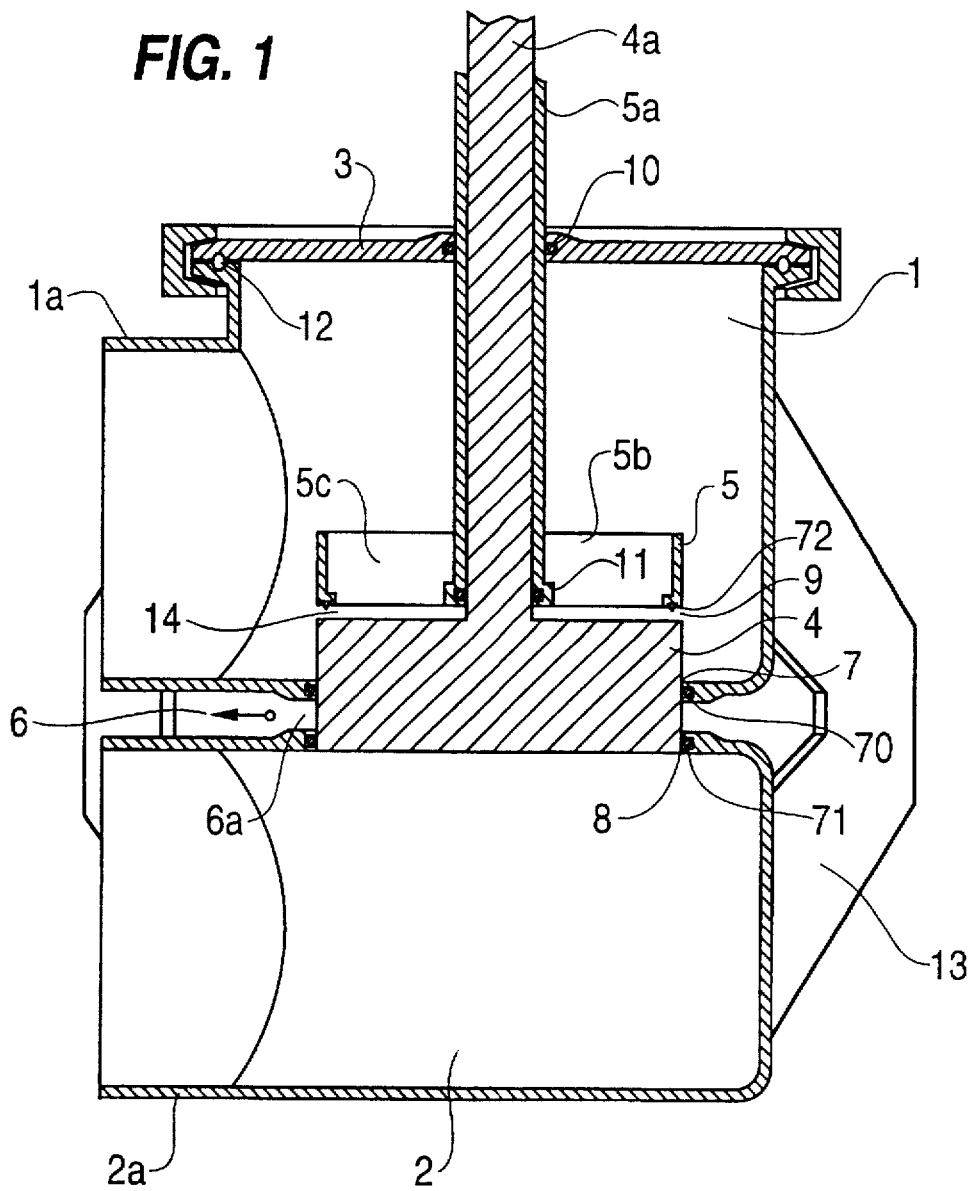

United States Patent [19]
Hammond

[11] Patent Number: 5,775,363
[45] Date of Patent: Jul. 7, 1998

[54] DOUBLE SEAT VALVE WITH A CONTROLLED LEAKAGE CAVITY

[76] Inventor: Duane Hammond, 440 Catskill Rd., Waukesha, Wis. 54936-1638

[21] Appl. No.: 698,106

[22] Filed: Aug. 15, 1996

[51] Int. Cl.⁶ .............................. F16K 11/20; B08B 9/02; B08B 9/06
[52] U.S. Cl. ............... 137/244; 15/104.16; 137/240; 137/312; 137/614.17; 137/614.18; 137/614.19; 134/166 C
[58] Field of Search .......................... 137/240, 312, 137/614.17, 614.18, 614.19, 242, 244; 134/166 C, 167 C, 168 C, 169 C; 15/104.16

[56] References Cited

U.S. PATENT DOCUMENTS 5,085,241  2/1992  Mieth .................. 137/312

*Primary Examiner*—George L. Walton
*Attorney, Agent, or Firm*—Lane, Aitken & McCann

[57] ABSTRACT

The invention relates to a double seat valve with a controlled leakage cavity according to the preamble of claim 1. It is an object of the present invention to create favorable conditions for complying, in most points, with the so-called US-American 3A standards and FDA regulations. This object is achieved inter alia by providing between the sealing places (7, 8; 70, 71) a penetration cross-section (6a) from the inside space of the valve casing parts (1, 2) to the leakage cavity which at least corresponds to the nominal cross-section of the double seat valve and by using the same dimensions for the connection via the leakage cavity (6) and between the leakage cavity and the environs of the double seat valve.

13 Claims, 4 Drawing Sheets

DOUBLE SEAT VALVE WITH A CONTROLLED LEAKAGE CAVITY

The invention relates to a double seat valve with a controlled leakage cavity according to the preamble of claim 1.

A double seat valve of the category is known from U.S. Pat. No. 5,085,241. With this known valve it is possible, apart from the known control of the connection between the leakage cavity and the inside space of the valve casing parts in the closed valve position, to control the leakage cavity in other positions of the valve.

The known valve has a number of disadvantages which make the practical application of the valve at least doubtful. If the two sealing places are realized by seals on the side of the valve casing, leakage-free switching is impossible with the known valve, as sufficient sealing between the locking piece and the closing member is not provided.

As the axial extension of the closing member and the locking piece results from the demand that the closing member in the closed position of the valve, and the locking piece in the open position of the valve, must completely cover the two sealing places, one endeavors to keep the axial distance of the sealing places as small as possible. This inevitably keeps the penetration cross-section between the sealing places and also the leakage cavity itself small. As in the known valve the leakage cavity is closed by the locking piece in positions other than in the closed position of the valve, it is neither part of the product chamber nor the product path and it can be held as small as possible with regard to its spatial shape, as proposed in the invention (cf. U.S. Pat. No. 5,085,241, Column 3, Lines 34–52).

This minimization of the leakage cavity, both inevitable and intended, and of the axial distance between the sealing places and the associated connection paths to the inside space of the valve casing parts and to the environs of the double seat valve has another serious disadvantage. In the event of sealing defects, inclusion of foreign particles or pressure hammers and the resulting leakages there is a risk of intolerable pressure build-up in the leakage cavity, since the small-sized outlets do not allow for self-draining of the leakage volumes as it is a general requirement today.

Self-draining of leakage fluids from the leakage cavity, however, is a requirement which has recently been gaining importance, especially on the US market or in the US sphere of influence, with regard to the application of double seat valves in dairy technology. The requirement in question is the US "3A standards and FDA regulations" stipulating that the leakage cavity shall be drainable towards the atmosphere through an opening with a cross-section corresponding to the nominal width of the largest pipe connected to the valve. For the known valve this means that the penetration cross-section between the two sealing places must correspond to the nominal cross-section of the valve. The technical concept of the known valve, however, is in contrast to this requirement.

It is an object of the present invention to create in a double seat valve of the category favorable conditions for complying, in most points, with the so-called US-American 3A standards and the FDA regulations Furthermore, when required, leakage-free switching of the double seat valve and sufficient cleaning of the two sealing places in the seat area are to be ensured as well as the inner and outer stem seal.

This object is attained by application of the distinctive features set forth in claim 1. Advantageous embodiments of the proposed double seat valve are set forth in the subordinate claims.

In the proposed double seat valve the leakage cavity is provided with a so-called "full-port". So far, a connection path of such a large size between the leakage cavity and the environs of the valve has been realized by leading either the closing member which is at the bottom in the installation position of the valve or the closing member at the top out from the associated valve casing part to the environs of the valve via a pipe of appropriate size. To seal off this pipe in the valve housing an additional seal of suitably large size is required which is critical from the technological and the bacteriological point of view. The proposed solution for the realization of the "full port" does not require an additional seal, but makes use of the obligatory seal in the seat area. In addition, the paths between the leakage cavity and the environs of the valve are extremely short, which helps to counteract intolerable pressure build-up.

Leakage-free switching of the proposed double seat valve can be achieved by means of a sealing place between the closing member and the locking piece, the sealing place being expediently realized by a seal provided in a face of the locking piece facing the closing member or in a face of the closing member which faces the locking piece.

As the two sealing places in the seat area are protected and supported by the closing member in the closed position and by the locking piece in the open position of the double seat valve, i.e. are not accessible, and hence cleanable in the traditional sense, in any of the valve positions, it is also proposed to provide the closing member in the direction it can be displaced with an axial length that corresponds at least to twice the axial distance between the sealing places or the seals. This design makes it possible to clean that part of the closing member that protrudes from the seat area and projects into one or the other of the valve casing parts by supplying cleaning solution from the appropriate valve casing part. The cleaned part of the closing member, i.e. the part flushed by the cleaning solution, can then be moved into the region of the two sealing places or seals by a number of partial strokes, thus subjecting this region, without uncovering it, to sufficient cleaning by "wiping". During this cleaning procedure, continuous double sealing is maintained between the valve casing part which holds cleaning solution or to which cleaning solution is supplied and the other valve casing part by the two sealing places arranged in series, i.e. the two seals, with the large leakage cavity in between and its "full-port" connection to the environs of the double seat valve.

In the same way the inner and the outer stem seal are cleaned such that those stem areas which have contaminated the assigned stem seal during the switching motion of the valve with product, supply cleaning solution to the stem seals by the same transport mechanism in the course of "wiping", i.e. by a number of repeated partial strokes.

To execute the wiping movements there is an actuator which in addition to strokes of the locking piece and the closing member for executing the opening and closing movement of the double seat valve causes the aforementioned partial strokes for wiping clean the sealing places and the inner and outer stem seal.

An example of embodiment of the invention is illustrated in the drawing and explained hereinafter.

Figure 2:
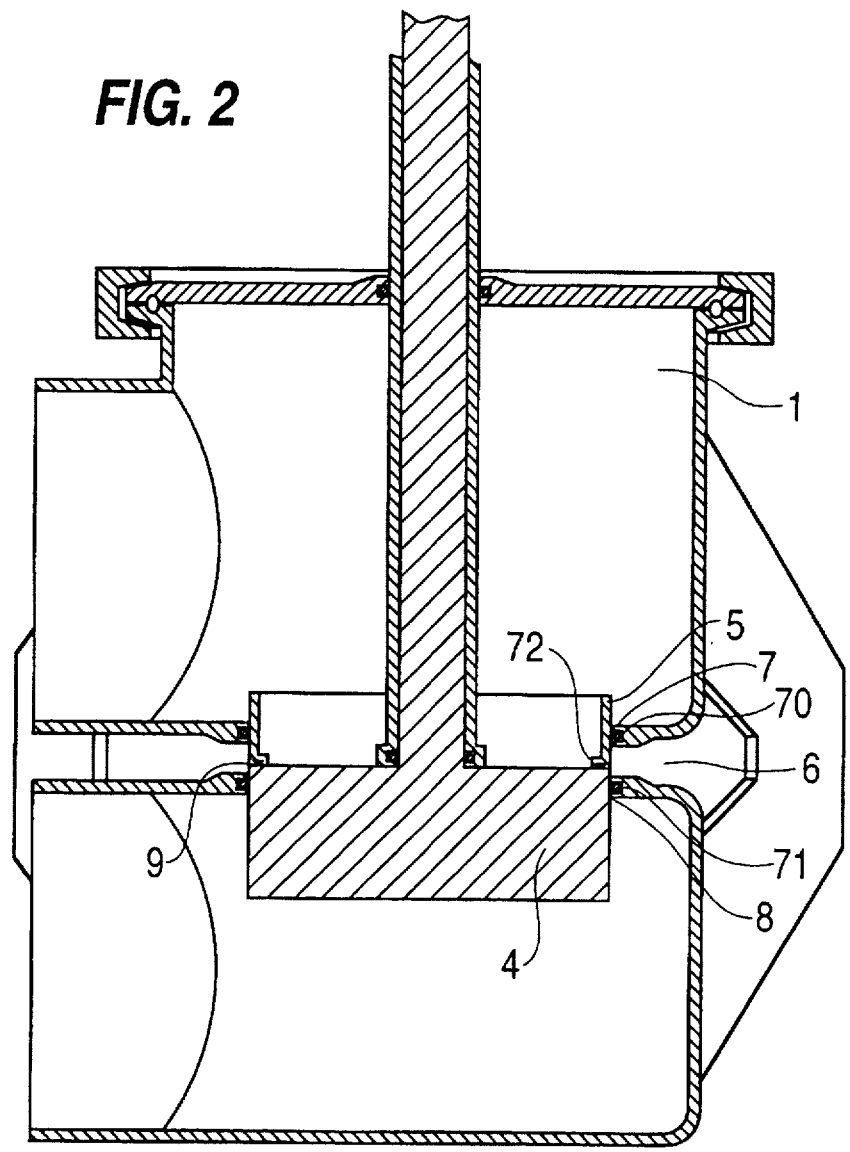
Figure 3:
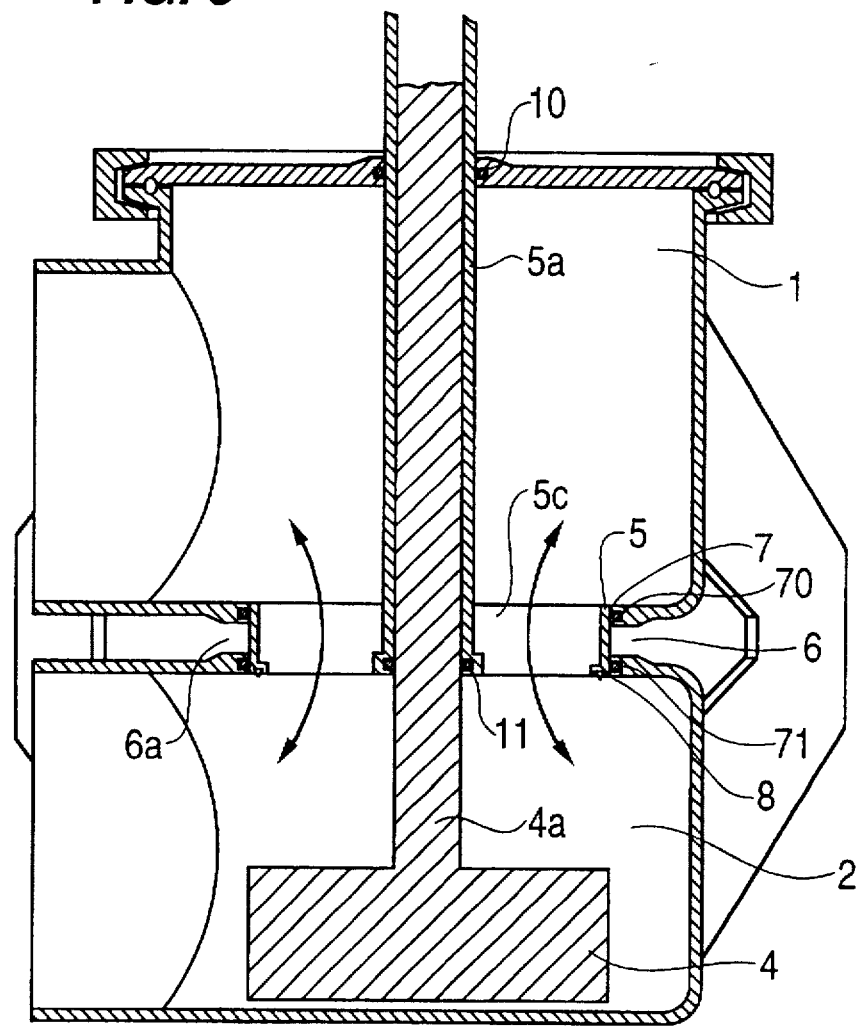
Figure 4:
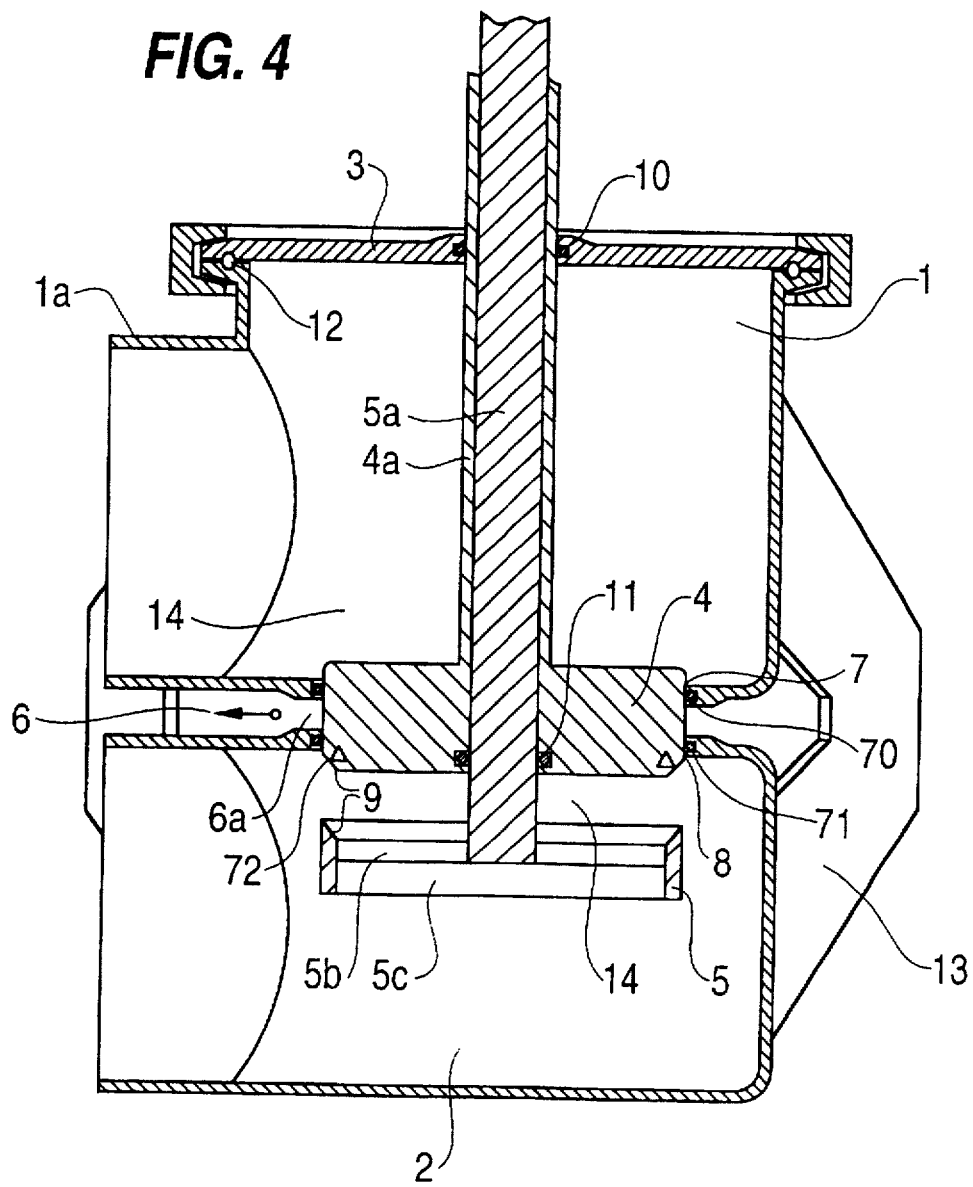

There are shown in:

FIG. 1 in simplified schematic illustration, not to scale, a center section through a preferred embodiment of the proposed double seat valve in the closed position;

FIG. 2 the double seat valve according to FIG. 1 in an intermediate position between the open and the closed position, with the third sealing place between the closing member and the locking piece being effective and the two sealing places in the seat area being formed on the one side by the closing member and on the other side by the locking piece;

FIG. 3 the double seat valve according to FIG. 1 in its open position, with the two sealing places in the seat area being formed by the closing piece, and the leakage cavity being sealed off by the latter towards the inside space of the valve casing parts; and FIG. 4 the preferred second embodiment of the proposed double seat valve in its closed position, in the installation position shown the closing member being located under the locking piece and consequently the valve opening to the top.

The double seat valve consists of the valve casing parts 1 and 2 and the casing closing part 3 (FIG. 1), sealed off by a casing seal 12 in the valve casing part 1. Between the valve casing parts 1, 2, connected to one another via casing connections 13, there are situated the first and second sealing place, 7 and 8, respectively, which in cooperation with a closing member 4 realize the double sealing which is the characteristic feature of a double seat valve. In the present embodiment, the sealing places 7, 8 are formed by discrete seals on the side of the valve casing, a first seal 70 and a second seal 71. Between the sealing places 7, 8 or the seals 70, 71 a penetration cross-section 6a to a leakage cavity 6 is provided which can, when required, easily be made with at least the nominal cross-section of the double seat valve.

For the embodiment of FIG. 1, the penetration cross-section 6a has an area which is annular, extending between the first and second sealing places 7 and 8 and extending around a circumference equal to that of the first and second sealing places. The area of the penetration cross-section of this and all embodiments can be made equal to or larger than the nominal cross-section of the double seat valve, that is, it can be made equal to or larger than the cross-sectional area of the largest pipe connected to the valve. Such a pipe has a cross-sectional area of the larger of the ports 1a and 2a of the valve casing parts 1 and 2, respectively.

Again, for all embodiments, the atmosphere is present at the penetration cross-section, which is numbered 6a in the embodiment of FIG. 1. Fluid which flows from the interior of the casing parts 1, 2 out through the penetration cross-section 6a is free to flow away from the penetration cross-section without any restriction. The casing connections 13 are discrete brackets spaced around the circumference of the valve to hold together the casing parts 1, 2, and, therefore, do not restrict flow or collect fluid in any way. The fluid is outside the valve at the penetration cross-section 6a, from which the fluid can flow on the outside of the casing part 2 and onto the ground below.

Above the closing member 4 there is disposed a locking piece 5 configured as a sleeve which has the same diameter as the closing member 4 and has a passage opening 5c which usually corresponds to the nominal cross-section of the double seat valve. The locking piece 5 is connected via ridges 5b with a hollow stem 5a. The stem is conducted through the casing closing part 3, sealed off by means of an outer stem seal 10, and connected to the actuator of the double seat valve (not shown on the drawing). Within the hollow stem 5a there is disposed a stem 4a by means of which the closing member 4 is operated by the said actuator. The hollow stem 5a and the stem 4a are sealed off against one another by means of an inner stem seal 11.

In the illustrated closed position of the double seat valve the closing member 4 and the locking piece 5 form a circular gap 14, so that passage through the passage opening 5 in the locking piece 5 is possible in both directions. In the region of the circular gap 14 a third sealing place 9 is disposed which in the embodiment is realized by a discrete third seal 72 provided in the locking piece 5.

Should leakage occur at either of the seals 70 or 71 or at both of them, this can be drained by gravity to the environs of the double seat valve via the penetration cross-section 6a and the leakage cavity 6. The same leakage protection is provided for any intermediate position (cf. FIG. 2) the double seat valve assumes when proceeding from its closed position (FIG. 1) to its open position (FIG. 3) or vice versa. In the illustrated intermediate position (FIG. 2) the first sealing place 7 is formed by the locking piece 5 and the first seal 70, and the second sealing place 8 by the closing member 4 and the second seal 71. The third seal 72 provides for sealing between closing member 4 and locking piece 5 (third sealing place 9), so that no fluid can pass from valve casing part 1 into the leakage cavity 6.

The open position (FIG. 3) is characterized in that the locking piece 5 in this position substitutes the effects of the closing member 4, which the latter produces in the closed position with regard to the sealing places 7, 8, i.e. the seals 70, 71, and the leakage cavity 6. Via the passage opening 5c in the closing piece 5 the inside spaces of the two valve casing parts 1, 2 are connected to one another.

FIG. 1 illustrates the aforementioned possibility of cleaning the part of the closing member 4 which projects into the valve casing part 1. The process of "wiping" can be effected as described before with regard to the partial stroke; the partial stroke can also be extended such that the locking piece 5 completely substitutes the closing member 4 with regard to the two sealing places 7, 8, under the condition that sealing at the third sealing place 9 is ensured.

Cleaning of the outer stem seal 10 takes place such that locking piece 5 by means of its hollow stem 5a is moved into its lowermost position in the seat area (open position of the valve) and then partial lifting movements are executed upwards out of this position and under the action of the cleaning solution (FIG. 3) The inner stem seal 11 is cleaned preferably in the position of the double seat valve shown in FIG. 3 since here the most thorough contact of the cleaning solution over the partial lifting movement of stem 4a in the assigned sealing area is possible.

The double seat valve suggested according to the invention can also be designed in a second embodiment (FIG. 4) such that locking piece 5 is located under closing member 4. In this case the double seat valve opens upward in the position shown. At this point closing member 4 is actuated via the hollow stem 4a by which the stem 5a necessary to actuate locking piece 5 is routed.

With respect to wiping clean the inner and outer stem seal 11 or 10 the embodiment according to FIG. 4 offers advantages. While in the first embodiment shown in FIGS. 1 through 3 wiping clean of stem seals 10, 11, in this respect can be done effectively, as is apparent from FIG. 3, only in the open position of the valve, in the second embodiment according to FIG. 4 the areas of hollow stem 4a and stem 5a which are contaminated with product in the closed position of the double seat valve and which offer the product their maximum possible extension in this critical position, can also be completely cleaned in this closed position without uncleaned stem areas remaining in the sealing area. Consequently by means of the aforementioned transport mechanism the sealing area is also sufficiently covered by cleaning solution, since in the closed position all contaminated stem areas are available to the cleaning solution in the valve casing. Since wiping clean takes place with the valve closed, product can be present in the other valve casing at the time.

It is apparent that with the valve closed the inner stem seal 11 can be cleaned from the lower valve casing part 2 and outer stem seal 10 from the upper valve casing part 1.

While a preferred embodiment of the invention has been illustrated and described to illustrate the application of the inventive principles, it will be understood that the invention may be embodied otherwise without departing from such principles.

I claim:

1. Double seat valve with a controlled leakage cavity provided with two sealing places disposed in series and on levels parallel to one another which in the closed position of the double seat valve prevent the overflow of fluid from one part of a valve casing into another; the leakage cavity being disposed between the sealing places and connected on the side of the valve casing to the environs of the double seat valve; with a locking piece designed as a slide and translatorily displaceable between a closed and on open position of the double seat valve, the locking piece in cooperation with the valve casing realizing the two sealing places radially on the outside, the locking piece furthermore controlling the connection between the leakage cavity and an inside space of the valve casing and in the open position of the double seat valve connecting the inside space of the two valve casing parts by a penetration aperture disposed radially on its inside; and with a closing member designed as a slide disposed relatively movable to the locking piece in the direction of the degree of its freedom of motion, the said closing member in combination with the valve casing realizing the two sealing places and controlling the connection between the inside spaces of the two valve casing parts, characterized in that between the sealing places (7, 8; 70, 71) a penetration cross-section (6a) is provided from the inside space of the valve casing parts (1, 2) to the leakage cavity (6) which is at least as great as the nominal cross-section of the double seat valve and that the cross-section of the connection between the leakage cavity and the environs of the double seat valve is at least as great as the nominal cross-section of the double seat valve to prevent pressure buildup in the valve casing by enabling fluid to exit the valve casing as fast as it enters the valve casing.

2. Double seat valve according to claim 1, characterized in that between the closing member (4) and the locking piece (5) is disposed a third sealing place (9).

3. Double seat valve according to claim 2, characterized in that the third sealing place (9) is realized by a third seal (72) disposed on a face of the closing member (5) which faces the locking piece (4).

4. Double seat valve according to claim 2, characterized in that the third sealing place (9) is realized by a third seal (72) disposed on a face of the locking piece (5) which faces the closing member (4).

5. Double seat valve according to claim 1 characterized in that the closing member (4) in the direction it can be displaced has an axial length which corresponds at least to twice the axial distance between the sealing places (7,8) or the seals.

6. Double seat valve according to claim 2, characterized in that the closing member (4) in the direction it can be displaced has an axial length which corresponds at least to twice the axial distance between the sealing places (7,) or the seals.

7. Double seat valve according to claim 3, characterized in that the closing member (4) in the direction it can be displaced has an axial length which corresponds at least to twice the axial distance between the sealing places (7,) or the seals.

8. Double seat valve according to claim 4, characterized in that the closing member (4) in the direction it can be displaced has an axial length which corresponds at least to twice the axial distance between the sealing places (7,) or the seals.

9. Double seat valve according to claim 1, characterized in that the closing member (4) and locking piece (5) are joined to an actuator which in addition to lifting movements for executing the opening and closing movement of the double seat valve causes partial lifting movements of closing member (4) and locking piece (5) for wiping clean sealing places (7, 8; 70, 71) and the inner and outer stem seal (11 or 10).

10. Double seat valve according to claim 2, characterized in that the closing member (4) and locking piece (5) are joined to an actuator which in addition to lifting movements for executing the opening and closing movement of the double seat valve causes partial lifting movements of closing member (4) and locking piece (5) for wiping clean sealing places (7, 8; 70, 71) and the inner and outer stem seal (11 or 10).

11. Double seat valve according to claim 3, characterized in that the closing member (4) and locking piece (5) are joined to an actuator which in addition to lifting movements for executing the opening and closing movement of the double seat valve causes partial lifting movements of closing member (4) and locking piece (5) for wiping clean sealing places (7, 8; 70, 71) and the inner and outer stem seal (11 or 10).

12. Double seat valve according to claim 4, characterized in that the closing member (4) and locking piece (5) are joined to an actuator which in addition to lifting movements for executing the opening and closing movement of the double seat valve causes partial lifting movements of closing member (4) and locking piece (5) for wiping clean sealing places (7, 8; 70, 71) and the inner and outer stem seal (11 or 10).

13. Double seat valve according to claim 5, characterized in that the closing member (4) and locking piece (5) are joined to an actuator which in addition to lifting movements for executing the opening and closing movement of the double seat valve causes partial lifting movements of closing member (4) and locking piece (5) for wiping clean sealing places (7, 8; 70, 71) and the inner and outer stem seal (11 or 10).

* * * * *

UNITED STATES PATENT AND TRADEMARK OFFICE
CERTIFICATE OF CORRECTION

PATENT NO. : 5,775,363
DATED : July 7, 1998
INVENTOR(S) : Duane Hammond

It is certified that error appears in the above-indentified patent and that said Letters Patent is hereby corrected as shown below:

"or the seals" should be deleted in the following places:

Column 5, lines 57 and 58;

Column 6, lines 4 and 5;

Column 6, lines 9 and 10; and

Column 6, lines 14 and 15.

Signed and Sealed this

Sixth Day of October, 1998

*Attest:*

BRUCE LEHMAN

*Attesting Officer*      *Commissioner of Patents and Trademarks*